United States Patent
Hjalmtysson et al.

(10) Patent No.: US 6,556,577 B2
(45) Date of Patent: *Apr. 29, 2003

(54) ARCHITECTURE FOR LIGHTWEIGHT SIGNALING IN ATM NETWORKS

(75) Inventors: Gisli Hjalmtysson, Gillette, NJ (US); Kadangode K. Ramakrishnan, Berkeley Heights, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/867,805

(22) Filed: May 31, 2001

(65) Prior Publication Data

US 2002/0003804 A1 Jan. 10, 2002

Related U.S. Application Data

(63) Continuation of application No. 09/633,112, filed on Oct. 24, 2000, now Pat. No. 6,243,387, which is a continuation of application No. 09/015,496, filed on Jan. 29, 1998, now Pat. No. 6,128,305.
(60) Provisional application No. 60/036,796, filed on Jan. 31, 1997, provisional application No. 60/036,899, filed on Feb. 6, 1997, and provisional application No. 60/051,969, filed on Jul. 8, 1997.

(51) Int. Cl.$^7$ .................... H04L 12/28; H04L 12/56
(52) U.S. Cl. .................................................. 370/410
(58) Field of Search ................... 370/395.1, 410, 370/396, 412, 428, 429, 397, 384, 385, 522, 524

(56) References Cited

U.S. PATENT DOCUMENTS

| | | | | |
|---|---|---|---|---|
| 5,029,164 A | * | 7/1991 | Goldstein et al. | 370/410 |
| 5,519,699 A | * | 5/1996 | Ohsawa | 370/410 |
| 5,574,724 A | * | 11/1996 | Bales et al. | 370/412 |
| 5,673,264 A | * | 9/1997 | Hamaguchi | 370/397 |
| 5,757,783 A | * | 5/1998 | Eng et al. | 370/315 |

* cited by examiner

Primary Examiner—Ajit Patel

(57) ABSTRACT

A method and system provide for a network using lightweight signaling for establishing connections. The method and system establish a best efforts connection between at least two terminals, on a hop-by-hop basis. Data can flow before and quality of service is established. The system enhances processing time for quality of service requirements and provides flexibility in establishing multicast connections.

33 Claims, 9 Drawing Sheets

FIG. 6A

| T | PID | |
|---|---|---|
| NSAP ADDRESS ||| 
| | Q | RESERVED |
| FLOW ID (SEQ.#) |||
| AAL5 – TRAILER |||

FIG. 6B

| T | REASON |
|---|---|
| RESERVED ||
| VC ID ||
| FLOW ID ||
| AAL5 – TRAILER ||

FIG. 6C

| TYPE | VC ID |
|---|---|
| FLOW ID ||
| SOURCE ADDRESS ||
| RESERVED ||
| AAL5 – TRAILER ||

ARCHITECTURE FOR LIGHTWEIGHT SIGNALING IN ATM NETWORKS

RELATED APPLICATIONS

This application is a continuation of application Ser. No. 09/633,112, filed on Oct. 24, 2000, now U.S. Pat. No. 6,243,387, which is a continuation of application Ser. No. 09/015,496, filed on Jan. 29, 1998, now U.S. Pat. No. 6,128,305, which claims priority to provisional application No. 60/036,796 entitled UNITE: AN ARCHITECTURE FOR LIGHTWEIGHT SIGNALING IN ATM NETWORKS, filed Jan. 31, 1997, provisional application No. 60/036,899, entitled ARCHITECTURE FOR LIGHTWEIGHT SIGNALING IN ATM NETWORKS, filed Feb. 6, 1997, and provisional application No. 60/051,969, entitled IP OVER UNITE—UNITE: AN IDEAL MECHANISM FOR IP OVER ATM, filed Jul. 8, 1997, the entire disclosures of which are hereby incorporated by reference.

BACKGROUND

The present invention is directed to a method and apparatus for providing a new signaling architecture for a communication network. More specifically the present invention provides for lightweight and extensible signaling in Asynchronous Transfer Mode (ATM) networks.

Modern communication networks need to support a wide range of applications with diverse service requirements. Network technologies that were traditionally designed and optimized for specific communication services are evolving towards accommodating this diversity on a single integrated communication infrastructure. Both Internet Protocol (IP) and Asynchronous Transfer Mode (ATM) networks have been moving in the direction of supporting a broad range of multimedia flows, possibly from different starting points. Both of these architectures support Quality of Service (Q of S) and integral to their approach is a notion of identifying flows, albeit with different amounts of persistent state being maintained in the network.

Connection oriented networks have been developed over the years for supporting applications that require stringent quality of service, and the ability to exploit switching to achieve good price/performance characteristics for internetworking. Switching has continued to maintain this superior price/performance in spite of the dramatic changes in system and semiconductor technology over the past decade. Several ongoing efforts to utilize switching for IP interconnection are grounded in the belief that these superior price/performance characteristics will continue to hold. The ability to use a short handle (e.g., a virtual circuit identifier (VC id)) to forward data is based on the desire to route once (a relatively expensive operation) and then switch (a cheaper operation) many times. ATM is a connection-oriented technology that has been designed to use switching for "scalable bandwidth". It has been proposed as an attractive technology for flexible support of guaranteed quality-of-service. At the same time, the scalability of a design with per-flow state has been questioned often, with good justification. It is clear that with tremendous number of flows impinging at some point, especially at the core of the network, flow aggregation is mandatory. Virtual paths in ATM networks offer one solution, see The ATM Forum, "ATM User Network Interface (UNI) Specification, Version 3.1, Prentice Hall 1995. The aggregation techniques espoused for integrated services in the next generation IP networks are another, see "Link-Sharing and Resource Management Models for Packet Networks," S. Floyd et al., IEEE/ACM Transactions on Networking, Vol. 3, No. 4, pp. 365–386 August 1995. These solutions favor avoiding signaling altogether at the cost of not being able to respond to the special needs of an individual flow. While this may be acceptable in some cases, there remains the need to improve signaling for a significant set of flows.

An example of a conventional ATM signaling procedure is illustrated in FIG. 1. In this configuration a calling station 101 seeks to setup a call to called station 110. In this setup operation the call is connected between the stations by intermediate switches 103 and 105. The part of the connection between the calling station 101 and switch 103 is referred to as a first hop. The part of the connection between the switches 103 and 105 is referred to as a second hop. The part of the connection between switch 105 and the called station 110 is referred to as a third hop.

In operation a complex setup message that includes, not only that which is necessary for fundamental connectivity, but also the requirements for Q of S, and other user-related functions, is sent by the calling station 101 to switch 103 at time $t_1$. The switch then must process the setup message, including performing admission control with reference to the Q of S requirements, before it forwards the setup message to switch 105. Similarly, switch 105 must process the setup message before it forwards that message to the called station. Involved in this processing is a determination, at the first switch, of the end to end route. This decision process is very complex because of the inclusion of "reassembly", route determination, and Q of S processing all at once.

The setup message is considered the repository of information to be communicated from the end-systems to the network for any and all additional functionality desired from the network for the call. This not only leads to a relatively large setup message, but the need to incorporate substantial facilities or information in the message structure to accommodate known and even potentially unforeseen requirements.

The switch, before routing the setup message, must reassemble the setup message and perform the potentially complex task of determining the Q of S requirements for the call being established. This information may potentially be used to both determine a Q of S compatible route and perform admission control functions. In addition, when a setup message arrives at the switch, the switch has to send a message back to the upstream node indicating a "call proceeding" state, so as to enable the upstream node to maintain short timers.

It is only when the setup message flows all the way to the destination, the called station, and a "Connect" message is returned all the way back from the called station to the calling station that the actual data flow may be started. Additionally an acknowledge message, a "Connect-Ack" message, has to flow from the upstream node (switch or end-system) to the downstream node to indicate to the receiving end that data may now begin to flow.

With this traditional connection setup, the use of the path is delayed until the connection setup is complete from end to end. One of the disadvantages is that this reduces resource utilization as the resources are allocated and held before they can be used. Studies of reservation schemes and connection setup on the Internet indicate that this penalty can be significant. Moreover, the Private Network to Network Interface (PNNI) signaling proposal for ATM may not be suitable for global scale networking, and yields low utilization of network resources unless precise traffic characteristics are known. The challenge in building a single network for both connectionless and connection-oriented services is to provide a protocol that nullifies complexity and the delay penalty of call setup, while supporting service guarantees and intra-domain manageability.

ATM's signaling mechanisms are woefully inadequate for the type of short transactions that typify current-day data communications, such as on the Internet. An interaction between a source and destination may comprise only a few packets of data. A majority of the flows in the Internet fit this pattern. The overhead of a heavy-weight connection setup is only amortized when there is a sustained interaction involving the exchange of a large number of packets. But this is true only for a relatively small number of flows. One approach is to use an existing virtual circuit (VC) to multiplex flows between a pair of routers, with the hope of aggregating multiple short transactions between different systems. This VC is used to carry flows that have similar characteristics. This potentially leads to a N*N virtual interconnection among multiplexing points, and when flows desire to be treated differently, it may lead to an even larger set of logical connections maintained on a semi-static basis.

Signaling also has been viewed as being too complex, with multiple messages required to setup a connection. Also, the complex encoding of signaling messages requires considerable processing. The desire to provide sufficient flexibility in the signaling process as may be required by any and all applications that are likely to use the network is one cause for the introduction of this complexity. Furthermore, current design of ATM or Signaling System 7 (SS7) signaling requires hop-by-hop processing of the setup message through the entire end-to-end round-trip to setup the connection. There is no exploitation of parallel processing across the multitude of switches in the path, nor is there any attempt to pipeline the processing of the connection setup (the route lookup to provide connectivity), the Q of S management function, or data transmission. A further complexity arises due to the layering of signaling over another reliable transport protocol (SSCOP) which results in considerable overhead at each hop. SSCOP results in a protocol stack implemented in software at each switch. This puts software and software processing squarely in the critical path for connection setup, thus making the architecture slow in handling call setups.

There are some fundamental drawbacks of the current design framework for ATM signaling that have broader implications than just the complexity of processing signaling messages. The first and foremost is the inextricable tie-up between connectivity and comprehensive description of the connection's characteristics. The result is the imposition of a penalty of processing a potentially complex Q of S request even for simple best-effort (b.e.) connections. In addition, this tie-up results in inflexible models for determining who chooses to request the Q of S, especially the parameters related to the connection: it is the sender only, receivers may not choose the Q of S parameters. Furthermore, changing parameters on an existing connection is an exception mechanism, which does not adapt adequately for a large class of applications that may in fact wish to adapt the Q of S parameters on an ongoing basis. In addition, where there are multiple participants on a connection (multicast), all of the participants on the connection have the same Q of S parameters. There is a perception that having the flexibility to provide variable Q of S for different users in a multicast conversation is valuable.

SUMMARY OF THE INVENTION

The present invention provides an improvement over known network architectures by providing a new architecture that uses lightweight signaling. In an embodiment of the present invention a new architecture provides for a separation of switching and controller (processing) functions. The architecture also employs a new setup mechanism by which a best effort connection is established from a calling station to a called station on a hop-by-hop basis. The best effort connection is established without performing processing of Quality of Service (Q of S) requirements or admission control.

Since the connection is set up on a hop-by-hop basis and Q of S need not be established, data can be sent from the calling station before the connection to the called station is complete.

Additionally, the present invention provides a unique setup mechanism referred to as a microsetup cell. That micro setup cell can incorporate a designation of a Q of S classtype which, without setting Q of S requirements, can better inform each switch at each hop of how to route the setup cell for connection setup.

The present invention further provides an architecture in which Q of S requirements and/or other connection service parameters are dealt with "in-band", that is, they are transmitted along the virtual circuit that constitutes a given connection and can be interleaved or interspersed with other data packets. Since the switch and controller are substantially separate in a given switching station in accordance with one of the embodiments, a switch can continue to transfer data downstream in the connection while its associated controller processes some service parameter information such as Q of S requirements. This aspect of the present invention is further exploitable in providing parallel processing of Q of S requirements to expedite Q of S processing for a particular connection. Also, this provides an architecture with extensibility, that is, service features can be defined or re-defined in an arbitrary fashion as the data/software necessary to provide such features is transmitted in-band, in the virtual circuit. No modification to signaling channels/protocols need be made.

In addition the present invention provides an architecture which facilitates multi-cast connections in which joining operation can be initiated by either a core/source or a leaf/destination. Furthermore, in connection with these multicast operations Q of S requirements can be established by any of the parties to the connection and in fact different parties can have different Q of S requirements.

These and other aspects of the present invention will be better understood from the detailed description that follows.

BRIEF DESCRIPTION OF THE DRAWINGS

FIG. 6A illustrates a setup cell in accordance with an embodiment of the present invention.

FIG. 6B illustrates an acknowledgment cell in accordance with an embodiment of the present invention.

FIG. 6C illustrates a marker cell in accordance with an embodiment of the present invention.

DETAILED DESCRIPTION

Overview

Figure 1:
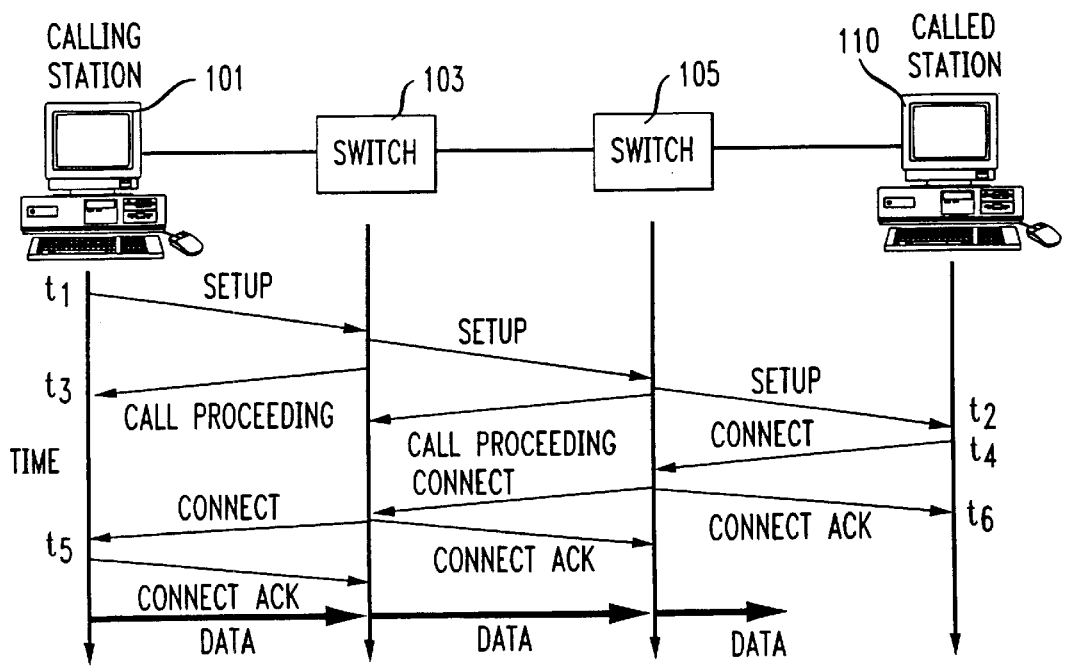
FIG. 1 illustrates a connection setup in a known communication architecture.

The promise of a lightweight connection setup in accordance with the present invention is to support connection-oriented and connection-less service on a single high-performance infrastructure, while riding the price/performance curve of switching. While realizing that network resources remain finite, the lightweight approach of the present invention is rooted in the observation that best-effort service is satisfactory for a significant fraction of network traffic. It is believed that routing based on Q of S classes is adequate, contending that grossly classifying flows according to their service objectives is sufficient to meet their goals.

The present invention overcomes the disadvantages of the prior art networks by taking a different approach to establishing connectivity. In the present invention the process of establishing connectivity is separated from the process of establishing quality of service requirements. The present invention provides a new setup message, a single micro-setup cell that enables connectivity to be established more rapidly. Furthermore, the micro-setup operation permits data to flow from hop to hop toward the destination station before the end to end connection is complete. This may be the only thing needed to establish best-effort traffic.

In another aspect of the present invention the route selected in establishing connectivity may be based on a "broad" class specification rather than a detailed Q of S specification. This provides some coarse description of the connection's Q of S while still avoiding performing the traditional processing (reservation and connection admission control) of connection oriented networks.

As part of establishing connectivity the present invention includes an end-to-end flow identifier, (flow id) unique to the connection, in the micro-setup cell. This flow id has many advantages. For example, it permits multicast operations with flexible join procedures so that a multicast connection can be established from a core location or alternatively a party constituting a leaf on a branch of the connection can call into the multicast. Also, the flow id is useful in avoiding loops in the setup of a virtual circuit.

Another aspect of the invention is the separation of the controller and switching operations. This enables the switch to operate more efficiently as a switch. Furthermore, it allows the system to send in-band information to a controller via the virtual circuit without overburdening or slowing down the switching of data along that virtual circuit established through that intermediate switching station.

The present invention also provides advantages in establishing a Q of S. First, since the controller and switching functions are separated all Q of S related signals, such as a request, can be provided as an in-band signal interspersed with other data. As the controller(s) along the connection operate on this request data still flows through the already established connection. Second, the Q of S processing technique enables the re-negotiation of Q of S during the pendency of a connection, and permits either party, the calling or called party to request certain Q of S requirements. Also, since in-band signaling is used all of the Q of S messages can be of arbitrary size.

Furthermore as regards Q of S, the present invention provides alternative techniques for processing Q of S requests that take advantage of the parallelism of a connection. In addition, the present invention provides for unique processing of Q of S requirements as they relate to different branches of a multicast connection.

In addition, the invention provides sufficient flexibility to accommodate multiple Q of S requirements from different parties to the same multi-cast connection.

The remainder of this description will describe the above features in more detail beginning with the concept of connection setup being separated from Q of S and then Q of S issues will be addressed.

Establishing Connectivity

The Hop-by-Hop Micro-setup

The present invention uses a separate, initial mechanism for connection setup for the purposes of connectivity, a micro-setup cell. This allows for a fast connection setup, with minimal function provided during the setup phase. Functions include providing best-effort connectivity and call routing based on a broad Q of S class identification, the latter to allow a reasonably high probability of success of subsequent Q of S setup requests. An important feature of the initial connectivity micro-setup mechanism is that it is on a hop-by-hop basis. The micro-setup message includes in it an address for the destination. In one embodiment Network Layer Service Access Point (NSAP) addresses, as in ATM UNI, are used for addressing end-systems. Alternatively, Internet Protocol (IP) addresses (e.g., IP v. 4 or IP v. 6) or any other consistent addressing scheme could be used.

Data may begin flowing from an upstream node to the downstream node immediately upon completion of the micro-setup on that hop. If so then data may begins to flow after a single hop round-trip propagation delay, plus the time needed to setup state on that hop, not an end to end setup delay. If the data flow is begun then data may be buffered on a switch when it arrives on a VCid for which a forwarding table entry has yet to be setup. In one embodiment each switching station may provide buffering for each vc. Alternatively limited buffering or no buffering may be provided in which case data could be discarded if it arrived at a switching station before that station has set up the next hop.

Although acceptable due to its best-effort semantics, to avoid excessive buffer overflows during setup, an efficient mechanism for setup for connectivity is important. To this end, a simple, efficient encoding of the micro-setup is vital. A single cell is used for the micro-setup, with only essential components in it, thus potentially allowing for hardware implementation. In addition, it allows for distributed call setup to be implemented in a switch (especially important when there are large number of ports). The initial micro-setup includes a Q of S class identification to allow for a minimal Q of S sensitivity in selecting the route. The micro-setup is performed on a signaling VC, that is, a default VC.

As described above, the micro-setup processing can be fairly simple, and is similar to the forwarding of a connectionless data packet. The encoding of the information in the micro-setup is oriented towards enabling hardware based processing of the micro-setup at the switch. As such, any TLV (type-length-value) encoding of the information in the micro-setup is avoided. Furthermore, the processing involves only determining at each hop the next hop along the route for the connection. This can be done with hardware using a forwarding lookup table to determine where the micro-setup should be sent. A VC id is returned to the upstream node in an ACK, and the upstream node may begin transmitting data. The forwarding of the data to the downstream next hop has to await the completion of the processing at the next hop switch and the return of a corresponding VC id for the flow. Any data arriving at the switch, before the completion of mapping to enable forwarding, is buffered if possible and otherwise dropped.

Figure 2:
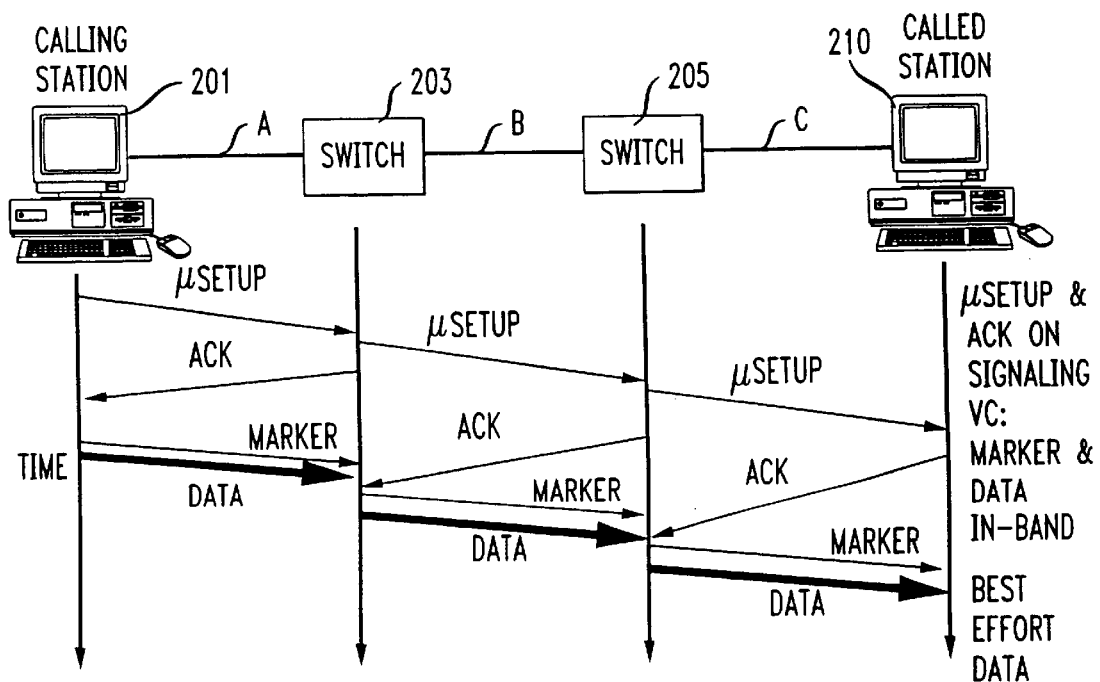
FIG. 2 illustrates a connection setup in accordance with an embodiment of the present invention.

FIG. 2 illustrates a connection setup in accordance with an embodiment of the present invention. Calling station 201 seeks a connection to called station 210. This connection is established via switching stations 203 and 205 over hops A, B, and C. Each switching station includes a switch and a control processor or controller that is preferably separate and distinct from the switch. The calling station generates a micro-setup cell, the structure of which will be described below. The micro-setup cell is forwarded to switching station 203 which does two things. It forwards the micro-setup cell to switching station 205 and sends an acknowledgment (ACK) to the calling station. In response to receipt of the ACK the calling station forwards a MARKER to switching station 203 on the established VC. It then can begin to send data over the virtual circuit setup over hop A. The data can be sent immediately after the MARKER has been sent. Similar operations take place over hops B and C and more details about the signaling will be provided. Before considering those details it is appropriate to note some of the significant differences between the call setup of the present invention versus the prior art of FIG. 1.

One significant difference is that the connection is really established on a hop-by-hop basis. For instance, in the connection operation in a conventional ATM UNI architecture the first switch 103 will compute the entire path for the connection from the source to the destination and will put the path in the setup message. By contrast, in the present invention, each switch, (e.g., 203) computes just what the next hop is on the way to the destination 210. This computation is performed at each switch given only that we are trying to get to the identified destination. This can involve using a forwarding table lookup operation that can be performed by the switch without intervention from the controller. Also, unlike the arrangement of FIG. 1 the upstream hops can be established without waiting for the processing of a downstream setup request. As a consequence, the connection is built more quickly in the arrangement of FIG. 2 than in the arrangement of FIG. 1.

Another significant difference is that data can start to flow from the calling station before the entire connection is completely established. If the data proceed to a switching station before that station has setup the next hop the data could be stored or buffered in a queue associated with the virtual circuit corresponding to that connection. The buffered data could then be transferred along the next downstream hop after the connection to the next station is completed. Although it is advantageous to provide per VC queuing it is not necessary. In those circumstances where per VC queuing is not provided the calling station might wait some time period before sending data to avoid the data catching up to the micro-setup operation.

The micro-setup and the associated ACK are sent on a well-known signaling virtual circuit. The processing at the switch includes the following functions, in order:

1. A route lookup for the micro-setup, identifying the port on which to forward the micro-setup, 2. Forwarding the micro-setup downstream on the link determined by the route-lookup function.

3. Allocation of a Virtual Circuit (VC) from the VC address space on the upstream link. It is assumed that all connections setup are bi-directional (to minimize the overhead of both ends establishing connections).

4. Allocation of a reasonable amount of buffering at the switch for that VC (if per vc buffering is provided).

5. Initiating an ACK-timer for the micro-setup. This timer is for error recovery when the micro-setup is lost or when the downstream switch does not successfully progress the micro-setup.

6. Mark the incoming VC state as DISCARD, discarding all incoming cells on this VC. This enables the clearing of buffers for the upstream link on the assigned VC, if there are any. The VC state transitions subsequently, when a MARKER acknowledging the ACK is received.

7. Finally, a VC id is returned to the upstream switch in an ACK.

In this embodiment the arrangement provides reliable delivery within the signaling framework itself, rather than layering it on top of another reliable transport mechanism. Current ATM UNI signaling uses a reliable transport protocol, SSCOP for transporting signaling messages. However, this inclusion of SSCOP re-incorporates some of the software overhead for processing a signaling message, and makes it difficult to implement in hardware. The 3-way handshake of the embodiment of the present invention obviates the need for a reliable transport for carrying signaling messages.

After sending (forwarding) a micro-setup, the sending node (switch or host) awaits the reception of an ACK, containing the VC id to forward data on. Due to any mismatch in network state (e.g., lost release) the sending node may in fact be forwarding traffic on the VC id assigned to the new connection. On receipt of the ACK, the node invalidates the existing VC (potentially triggering a release) and assigns the VC id to the new flow. To demarcate the onset of the new data stream, a MARKER, as the third phase of the three-way handshake, is transmitted in-band to the downstream node. Reception of the MARKER on the downstream node confirms reception of the ACK, and makes the incoming VC active. The use of the three-way handshake ensures that data at both the upstream node and the link related to the newly allocated VC id are flushed of old data at the time the downstream switch receives the MARKER. The three-way handshake also allows for recovery from loss of the ACK. The MARKER is the first cell sent on the new VC (in-band) by the upstream node. Everything that follows this MARKER is a valid data cell for the new flow. The MARKER includes the Flow ID, the VC id assigned by the downstream node, and a bit to indicate if the version of the MARKER is a retransmission or not. In addition, the source address (in the example an NSAP address) is included for the benefit of those controllers interested in it. The controller may, for example, use the source address for functions, such as VC re-routing or generating an out-of-band RELEASE. The VC remains BLOCKED until a forwarding entry is returned from the switch further downstream, at which time its state changes to FORWARD (the VC is operational on that hop). The upstream node ("source"), after sending the MARKER, sends data on this VC id. The upstream node also buffers in a retransmit queue, data being sent after the MARKER, for up to one hop round-trip time (RTT) after the ACK was received. If a retransmission of the ACK is received before the timer expires, this probably signals a loss of the MARKER. Therefore, the upstream node ("source") retransmits the MARKER and then the data that is buffered in the retransmit queue. If no ACK is received within the retransmit time for the MARKER, then the source can safely assume that it was received by the downstream node, and can flush its retransmit queue. Thus, the retransmit queue is only for startup of a connection, with a limited size of one hop RTT worth of data. A switch may not support a retransmit queue. In that case, it withholds forwarding data until the expiration of a timer that is set after sending the MARKER.

Although it may be conceivable to ignore Q of S objectives completely while establishing connectivity, the architecture of the present invention provides a field in the micro-setup cell for gross Q of S classification. Although having a complete specification of the Q of S requirements for the flow may be useful for admission control it is believed that full Q of S parameter processing is unnecessary for routing. Still, there are potential benefits in providing some type of service classification. In particular it is recognized that there are different objectives for delay sensitive and high bandwidth connections. Moreover, as all single class admission policies discriminate against large requests, some classification support is needed to implement richer admission policies. The Q of S class (shown in this example as a single byte) is viewed as a hint to improve the likelihood of success on the subsequent Q of S request for that connection. The inclusion of a small number of such classes is not an impediment to hardware processing of the micro-setup. For routing purposes at the switches multiple forwarding look up tables could be maintained. In fact one such table could be provided for each Q of S class type.

The actual parameters within the Q of S class are primarily used for the purposes of connection admission control (CAC). It is envisaged that identifying a small number of classes will be sufficient to assist in routing the connection request. For example, the classes seen as being immediately relevant are: i) best effort, ii) delay sensitive, and iii) high bandwidth. Other classes, and potentially richer encoding in the Q of S class identifier, for example, to convey a coarse approximate notion of the size of the flow, may provide additional benefits.

To illustrate the underlying principles, the inventors have simulated a range of policies for distributing load among a set of alternate paths, each path modeled as a single fluid server, where jobs arrive according to a Poisson process requesting bandwidth for some duration. Jobs arriving at a server with insufficient bandwidth are blocked and lost. This simple model is used to illustrate two points: (a) that the benefit of complex on-arrival algorithms may not be substantial even with exponential holding times, and that this benefit all but vanishes if the duration distribution has heavy tail (e.g., Pareto), and (b) that policies that reduce overall blocking do so by discriminating against large requests. As recently reported there is increasing evidence of call duration being distributed according to a heavy-tail distribution. In the graphs shown in FIG. 3, the effect of different "routing" policies using total capacity of 20, 80 and 320, segmented into paths such that each path has capacity 10 (i.e., 2, 8, and 32 paths) is illustrated. Bandwidth requests have exponential distribution with a unit mean. Two duration distributions are considered, exponential, and Pareto, in each case with unit mean duration. The offered load is 90%. The parameters chosen here are for illustration purposes only. Four different policies are compared in FIG. 4: Random Routing (RND), Round-Robin (RR), Sticky Random Routing (SRR), and Route to the Least Loaded path. The SRR used in this experiment simply picks a route at random, and sticks with it until it fails (i.e., a call is blocked).

Figure 3A:
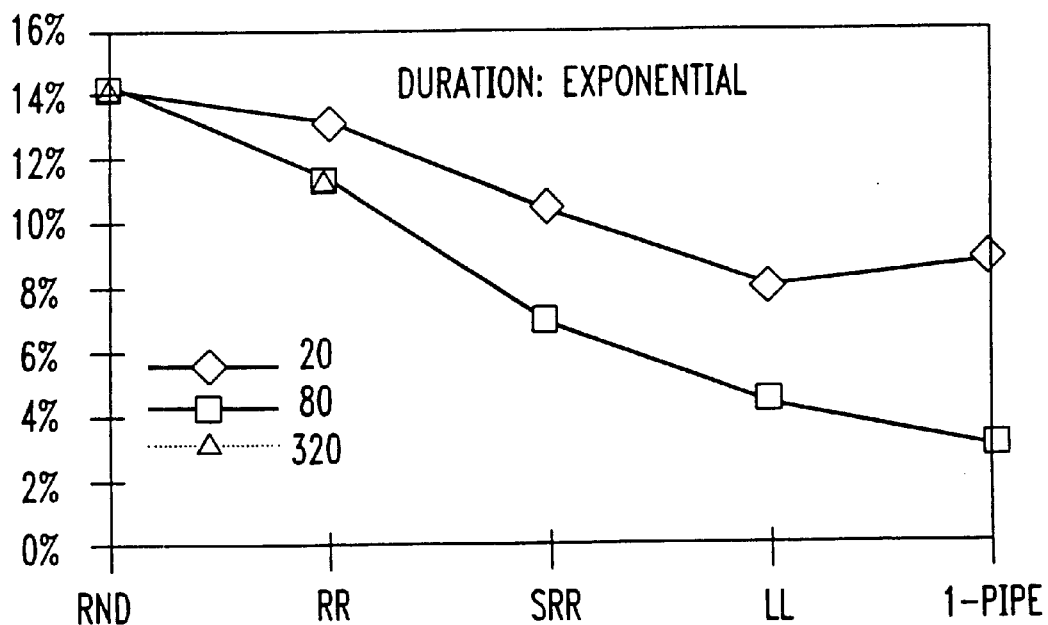
FIGS. 3 and 4 are directed to explaining aspects of the class routing techniques of the present invention.
Figure 3B:
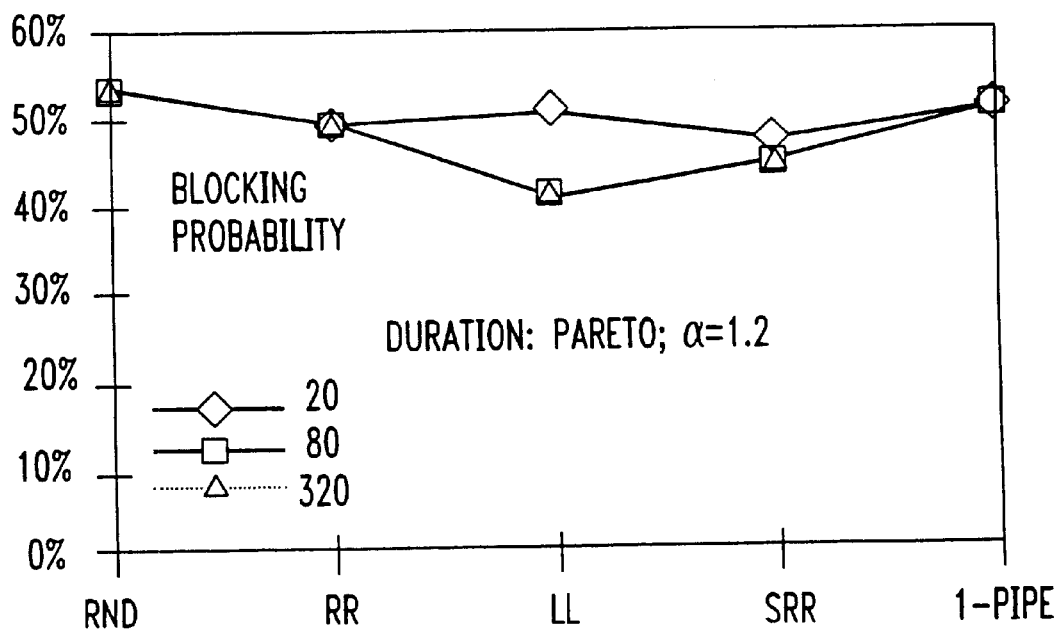

FIG. 3 shows the blocking in this simple system. In the left graph, the service time is exponentially distributed, whereas on the right, the service time is distributed according to a Pareto distribution, with tail-decay parameter $\alpha=1.2$ (thus finite expectation, but infinite variance). With exponentially distributed durations, the least-load algorithm outperforms the others, significantly improving on simple random assignment. However, as seen the SRR policy achieves most of this improvement. However, looking at the behavior with the Pareto distribution for the holding times (on the right), we see little or not difference across the policies. Indeed, for general distributions joining-the-shortest-queue need not be optimal. In fact, the blocking probability with the single large pipe looks just like that for the policies that operate in the more difficult situation of having to distribute load. This is because the single pipe may let in large jobs, thus penalizing (blocking) several smaller incoming jobs subsequently. These simulation results are primarily to show the relative differences between the alternative strategies. The primary lesson here is that whatever little difference may exist with exponential holding time distributions tends to disappear when the holding times tend to have a heavy-tailed distribution.

This motivates the thinking in the architecture of the present invention to use simple policies in hardware for choosing the path to route an incoming call.

Figure 4:
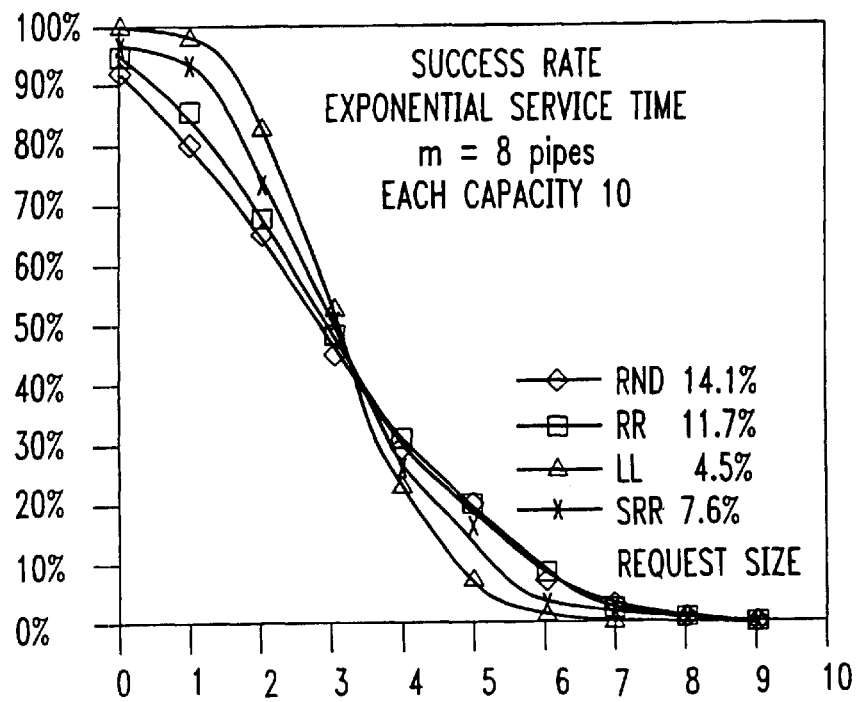

One argument for Q of S in ATM is the diversity in service requirements. While a phone call may only need 10–64 Kbps, other applications may demand tens or hundreds of megabits per second. Any single class scheme, optimized to reduce blocking will favor small requests, and under heavy loads reject almost all large requests ("large" meaning significantly larger than the mean), even when total blocking rate is low. FIG. 4 illustrates this point using the model from above.

The figure shows request success rate as a function of bandwidth requirements, for the four policies used above. Depicted is the case for 8 paths (total capacity 80). The legend shows the overall blocking. From the figure it is evident that the policies with lower overall blocking achieve it by discriminating more against larger requests. In particular the least-load policy in this case blocks only 4.5% of all requests, but a request of size 3.5 still has less than even chance of success. In telephony, where trunk reservations may be used in the phone network for overload control and disaster recovery, this problem is traditionally dealt with through service classes and trunk reservations, which has been shown to be asymptotically optimal for larger networks.

This provides motivation to include mechanisms within the present invention to implement richer access policies. By providing a class indication in the micro-setup, routing in the present invention can implement a form of dynamic trunk reservations, by routing on a class selected topology graph (per class routing table). Whereas small local switches may not differentiate strongly between classes, sophisticated backbone switches may employ elaborate policies to segregate classes.

Of course a major issue is how many classes are needed? The fact that all single class algorithms discriminate against size rationalizes the inclusion of a "large" request (high-bandwidth) service class. Seeing delay sensitivity as a distinctively different objective, and being somewhat incompatible with bandwidth only requests, justifies the inclusion of a "delay-sensitive" class. Other service classes may be warranted such as providing locally meaningful classes. It may also be possible to provide paths which include switches ignorant of classes. Thus the precise definition of the classes and the precise number of classes may vary over time or may vary depending on any number of circumstances. It may also be different at different places in the network. Nonetheless, it is believed that providing a few, rather coarse, classes will be sufficient to improve the connection setup process.

The architecture of the present invention adopts hop-by-hop routing of the micro-setup, in contrast to the traditional source-routing used in ATM's PNNI routing protocols. Routing protocols for best-effort traffic have typically used hop-by-hop shortest path routing. However, to support Q of S, and to avoid loops, source-routing has been used. Since the architecture of the present invention incorporates within the micro-setup cell a flow-id, which is a unique end-to-end call-reference identifier, this id may be used to detect loops. When a duplicate micro-setup is received with the same flow-id, without it being a re-transmission (or on a different port than the port an earlier copy was received on) it indicates a routing loop. The architecture suppresses multiple micro-setups (a mechanism we also use for multicast connections for normal operation). A controller might also send a release in the backward direction for the flow-id (or allow timers to subsequently close the connection). This mechanism ensures that a successful connection does not contain a loop. Routing loops are mostly transient inconsistencies in routing tables, which are expected to be corrected by subsequent updates as part of the normal operation of the routing protocols.

Micro-setup Cell Structure, ACK and Marker Structure

The motivation is to keep the micro-setup as a single cell. This allows the switch to avoid re-assembly and segmentation. In addition, all of the requirements to keep the cells in sequence may be ignored: a micro-setup cell may be served in any order, relative to the others. Thus, we could choose to process the micro-setup for some classes in hardware, and others in software, if so desired. Furthermore, it allows for a truly distributed implementation of the micro-setup because there is no need for a single point of re-sequencing the cell streams for signaling messages arriving on different ports and the complexities introduced therein. A fixed format micro-setup cell also assists hardware implementations.

An example of an embodiment of such a micro-setup cell is shown in FIG. 6A. The fields of the micro-setup cell are:

1. Type (T) (1 byte)—type of signaling cell
2. Protocol ID (7 bytes)—allows the caller to specify the network layer entity addressed at the called station and eliminates a need for a second exchange to establish this connectivity. It includes the SSAP, DSAP, OUI fields and the PID, as specified in ATM UNI or IEEE 802.3.
3. Destination Address (20 bytes)—destination NSAP address.
4. Q of S Class (1 byte)—for minimal Q of S sensitive routing.
5. Flow-id (8 bytes)—A unique (end-to-end) Flow-id identifying the micro-setup from source.

One possible unique flow identifier comprises two sub-fields:
   A unique source identifier. For example, this could be the host "Ethernet" address, that is unique through the use of an address ROM (6 bytes).
   A source unique sequence number (2 bytes).
6. AAL5 Trailer (8 bytes)—the standard ATM AAL5 trailer including the CRC and length.
7. Reserved (3 bytes)—for future use.

In addition, of course, is an ATM cell header (5 bytes). The VC id on which the micro-setup is transmitted is a common, well-known signaling VC.

A switch might then maintain a timer associated with the micro-setup that has been transmitted to the down-stream hop. This timer is cleared upon receiving the ACK from the downstream switch. A switch that has timed out after transmission of the micro-setup retransmits the micro-setup request. The re-transmitted micro-setup is identical to the previous, and as a result, can be retransmitted by hardware.

The Acknowledgment (ACK) of the connection setup upon successful processing of the micro-setup is returned upstream to the previous switch or host. The information provided has to be adequate for appropriate processing at the upstream switch or the original host requesting the connection. The downstream switch maintains a timer associated with the ACK that they transmit upstream, for re-transmitting ACKs. An example of the micro-setup's ACK is illustrated in FIG. 6B and may have the following fields:

1. flow-id (8 bytes): the flow-id received in the micro-setup, to enable the upstream node to match this ACK to the request.
2. VC id returned for the request (3 bytes).
3. Reason code (1 byte): for a successful setup, this would be zero. For a failure a reason code is returned. Possible reasons include:
   the downstream switch timed out on the micro-setup request that was forwarded on;
   the downstream switch did not have any VC resources available;
   the downstream switch did not have a path that could meet the Q of S class of the request;
   the downstream received a duplicate request with the same flow id;
   the downstream switch received a failure from a node upstream, subsequent to the micro-setup request;
   the called end-system did not have a network entity that responded to the original micro-setup request; or
   the called end-system requests a different Q of S for the call, when a Q of S path is to be established.
4. A type field T (1 byte)
5. AAL5 Trailer (8 bytes)—the standard ATM AAL5 trailer including CRC and length.
6. Reserved—for future use.

The Marker is a single cell with a 5 byte cell header. An example of a possible Marker structure is illustrated in FIG. 6C. The Marker of the illustrated embodiment has the following fields in the payload:

1. Virtual Circuit ID (VC id)—3 bytes
2. Flow ID (8 bytes)
3. Source Address (20 bytes)
4. Type Field (1 byte)
5. Reserved (8 bytes/—for future use)
6. AAL5 Trailer (8 bytes) including a 4 byte CRC.

In this example the Marker is a 53 byte cell with 48 bytes of payload.

Release

The final part of the protocol for unicast communication is that of a RELEASE. One of the difficulties in a lean-and-mean design, is that the network doesn't necessarily have the NSAP addresses for the two ends of a connection. Therefore, the RELEASE process has to count on either the dynamic handle that the VC id is, or the RELEASE has to be progressed on a hop-by-hop basis, just as was done for the micro-setup.

If the RELEASE is performed in-band (i.e., on the VC for which the RELEASE occurs), then substantial efficiencies are gained—both in saving a route lookup for the forwarding of the RELEASE, and also in that the internal multicasting capability at the switch (described below in relation to Q of S processing) can be used to efficiently forward the RELEASE. We perform an in-band RELEASE when end-systems want to voluntarily tear-down a VC. An end-system that wishes to perform the RELEASE transmits a single cell RELEASE message on the VC, which is encoded in the header with a PTI field that indicates that it is an in-band signaling cell, and a payload indicating that it is a RELEASE. The switch receives the RELEASE cell, multicasts it to the downstream link and to its associated controller. The controller releases the resources, and the VC is thus torn down. There is no need for any acknowledgment for the in-band RELEASE message.

If switches or end-systems time-out a flow, or when a link breaks and a switch decides to release a VC, then there may be a need for an "out-of-band" RELEASE message. The out-of-band RELEASE message is similar to a micro-setup in that it is a single cell transmitted from either an end-system or switch towards the source and destination of the VC. Such a RELEASE could contain:

a flow ID (which is a 8 byte ID, with 6 bytes for the source end-system ID, and the 2 byte sequence number that was used in the micro-setup to identify the call at the source)

the Q of S class, which may be used to assist in forwarding the RELEASE cell the VC id.

the destination NSAP address, if available. Although the destination NSAP address is included, at this point it is unclear how useful it is.

When a RELEASE is received at a switch, the lookup is performed on the VC id to determine on which link the RELEASE has to be forwarded, on a hop-by-hop basis, with appropriate changes to the VC id field for the downstream link. The RELEASE needs to be forwarded in both directions, towards the source and the destination of the call. Therefore, it is critical to include the VC id in the RELEASE. The Flow ID and the Q of S class fields of the RELEASE are used for error checking before the VC is released.

If a RELEASE is received on a non-existent VC, the RELEASE is dropped.

Multicasting

The same general concepts described above in relationship to a two party connection can be applied to a multiparty or multicast call. In fact, the architecture of the present invention incorporates the functionality of having multipoint-to-multipoint communication as an integral part of the signaling architecture. The simpler cases of point-to-multipoint or multipoint-to-point multicast calls are simple sub-cases of this overall multicast architecture.

The simple difference between a unicast call and a multicast call is that the micro-setup issued indicates that the call is potentially a multicast call. The entire multicast connection setup will be described in the framework of a multipoint-to-multipoint call, where the underlying network forwarding mechanism can manage issues such as cell interleaving. Therefore, we will first describe procedures that are applicable for core-initiated joins (for core based trees), which are similar to a source-initiated join for a source-based tree. We then describe leaf-initiated joins for other participants that join subsequent to the call being setup.

Core/Source Initiated Joins

Core initiated joins (or source initiated joins) are relevant when the set of participants is known initially. The core issues a micro-setup knowing the address of each individual participant. In the described embodiment that is a NSAP address, since there is no way to package more than one NSAP address in the micro-setup, an individual micro-setup is issued for each of the participants. This is not debilitating because: (a) the micro-setup is relatively "cheap" and (b) the number of participants that subsequently join using leaf-initiated joins may dominate (making such packing irrelevant).

Figure 7:
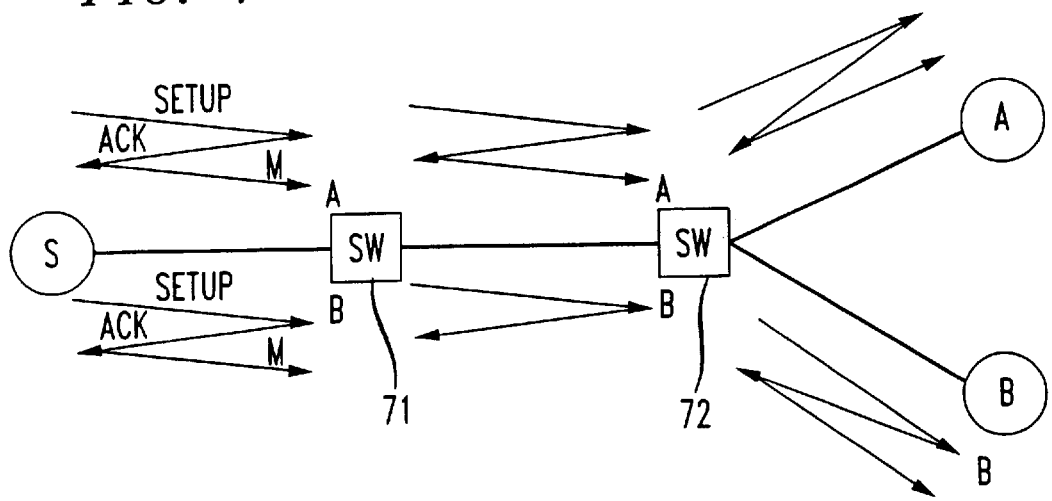
FIG. 7 illustrates an arrangement for a core/source initiated multicast in accordance with an embodiment of the present invention.

FIG. 7 illustrates an example of a core/source, S, initiated join in accordance with an embodiment of the present invention. A first micro-setup issued by the source to a participant, say A, includes a label (in the "Type" field) to indicate that it is a "multicast-capable" call setup. The rest of the micro-setup is similar to that described for a unicast call. The flow-id is determined by the originator (the core or sender). The flow-id acts as a call-reference identifier for the multicast call. A second micro-setup is issued for a subsequent participant, such as B, and uses the same flow-id, and the cell type is again labeled as a multicast. Because it uses a different destination address this second microsetup is not suppressed. Note that the first switching station 71 will send an Ack in response to both micro-setup cells. Also, the source S, in response to those Acks will send a Marker cell. The first switching station 71, however, will discard or suppress the second Marker it receives as it is identical to the Marker it received first. There does arise the need to regenerate the marker at the branching switching station, 72, since both A and B must receive Markers. In that circumstance branching switching station 72 can use the first received marker, stored for example when A was joined to the connection, to regenerate a Marker for transmission to B. This set of circumstances is illustrated in FIG. 7 where it can be seen that between source S and switching station 71 there are two three-way handshakes. Between switching stations 71 and 72, assuming that the marker for A is sent first, there is one three-way handshake related to the connection to A and one two-way handshake (setup and Ack) related to the connection to B. Then, there are again two three-way handshakes between switching station 72 and the destinations A and B. Thus at a new branch point on the multicast tree, a marker is required to the new destination: this is because that branch of the tree needs to be flushed of any old data that is currently in existence for that VC identifier. The controller at the switching station of that branching unit is responsible for generating and sending this in-band marker. Subsequently, data may be forwarded on that VC id, as a result of a proper three-way handshake.

The flow-id used in the micro-setup is retained at the switch, as a means of identifying the multicast call. During joins, the switch sending the micro-setup maintains state in the switch (not just the controller) which includes the flow-id and the destination NSAP address to which the setup was issued (the new leaf). This way, ACKs that return for the individual setups issued may be matched up by the switch, for purposes of managing their retransmission.

Leaf Initiated Joins

Mechanisms for Leaf Initiated Joins (LIJ) are somewhat similar to those suggested in the conventional ATM Forum UNI 4.0. However, instead of having a separate "LIJ" and "Add-Party" mechanism, the present invention uses the same mechanisms of the micro-setup for performing a LIJ.

Figure 8:
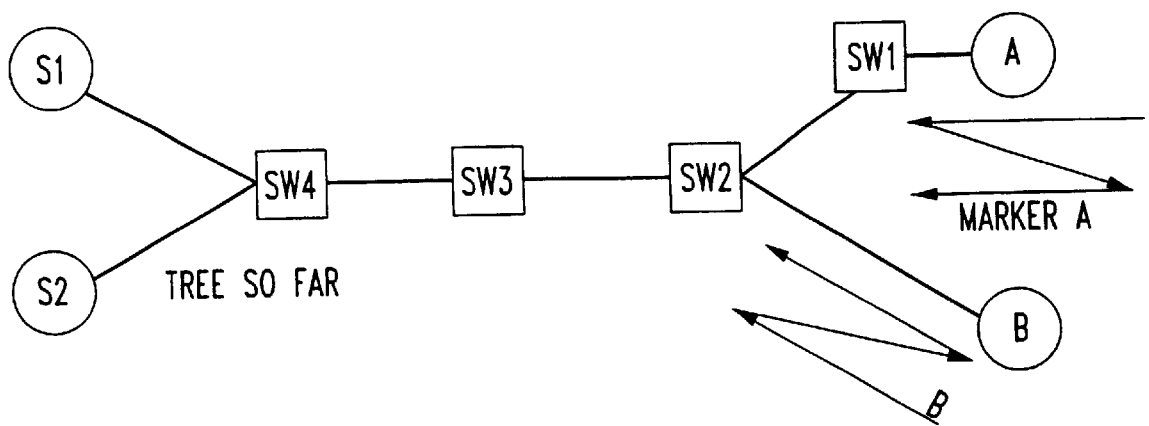
FIG. 8 illustrates an arrangement for a leaf join multicast in accordance with an embodiment of the present invention.

Referring to FIG. 8, an example is illustrated of an LIJ where two participants A and B wish to join the multicast tree, that currently ends at Switch $Sw_4$. The LIJ is a micro-setup (the Type indicator indicates that this is a LIJ for a multi-cast call) from one of the participants, that is directed towards the core/source, using the NSAP address corresponding to the core/source. The Flow ID used in the micro-setup is the multicast call reference identifier, and is stored at the switches as the micro-setup is forwarded upstream towards the core. It is assumed that the underlying call routing mechanisms direct the micro-setup towards the source/core in accordance with the appropriate criterion (e.g., shortest-path or least cost). Thus assuming an LIJ from A arrives at switching station Sw2 and is the first to arrive it will be forwarded toward the selected core/source using the technique described above. When a second LIJ arrives at that same switch from another participant, such as B, the Flow ID is recognized as already existing at the switch. The forwarding of B's micro-setup is then suppressed. Note that this happens even though the LIJ of the first participant added on this branch might not yet have reached the tree at Switch Sw4. When the micro-setup from A is issued, the three-way handshake results in the marker being forwarded by the switches upstream. This effectively "opens" up the VC from the node A up to the branching point, at Sw4. Along with the suppression of the micro-setups, subsequent markers are also suppressed at the switches.

As is seen from the above description the present invention provides an architecture that separates connectivity from Q of S processing using a less complex signaling structure. The result is less delay in establishing connections and flexibility in establishing unicast or multicast connections.

Furthermore, the invention provides for a greater separation of controller and switch functionality.

The controller may maintain comprehensive call information, including the "Flow-ID", which is the equivalent of a call reference identifier (that is relevant for all the entities involved in the connection, unlike a hop-by-hop reference in ATM); the Q of S characteristics for the call, and the NSAP address(es) associated with the call (destination NSAP address, and optionally, the source NSAP address). The controller may or may not maintain the VC id mappings from the source port to the destination port (to potentially allow for switches that may not even be ATM cell switches).

The switch maintains minimal state information for the call, including the flow id (motivated by multicast loop detection and hop-by-hop RELEASE), the VC id on input and output link, and the mapping from input port to output port for the call. Included is the characteristic of whether the call is strictly unicast or multicast capable. In addition, the switch maintains information provided from the controller to enable it to service the VC appropriately.

The motivation for maintaining NSAP addresses at the controller instead of the switch is that we would like to keep as small an amount of state as possible at the switch, but maintain more complete information of the state of a connection (including NSAP addresses) at the controller. The state information in the switch is kept small so that it is just the essential pieces of information required to perform forwarding with the appropriate service policy.

The separation of switching and controller functionality, is also one of the aspects of the present invention that provides a network architecture with extensibility. The in-band signaling, which can then be processed by the controller without negatively affecting data flow through the switches, provides the opportunity to flexibly define service parameters and to pass information between the various network controllers. Thus, the service possibilities of the network are more freely adaptable or variable without having to commit to a particular signaling protocol as is typical in most architectures where control issues are dealt with in separate signaling channels. Extensibility and flexibility are therefore hallmarks of the architecture of the present invention.

Having reviewed the connectivity aspects of the present invention attention is now turned to establishing Q of S requirements in this architecture.

Q of S Management

It is anticipated that a large subset of flows will not use an additional phase of a Q of S setup for establishing a distinctive quality of service. The Q of S class specification that is provided in the initial micro-setup may be adequate for a reasonably large subset of flows. For example, best-effort flows (which may be adequate for a large class of TCP/IP and UDP/IP flows carrying non-real-time data) clearly don't need to have a subsequent Q of S setup phase. Similarly, well-understood real-time flows such as telephony traffic ($\mu$-law, $\alpha$-law) may be adequately specified as being "delay-sensitive." High bandwidth flows such as FTP, Web image downloads etc. may similarly be sufficiently specified as a simple "high-bandwidth" Q of S class. For those flows that do require a detailed Q of S negotiation however, the process of Q of S setup described below is used.

One of the motivations for performing the Q of S negotiation after the connection is setup is that the Q of S needed for a connection is often not known a priori. It may only be after an interaction between the end-systems, for example a client and a server, that the Q of S needs of the flow are known. The present invention provides the appropriate semantics for this type of Q of S setup: the initial connection establishment allows for the initial interaction and the flexibility of allowing either end of the connection to request the Q of S enabling either a client or server to initiate the Q of S.

The Q of S setup is performed in-band on the already established best-effort VC. The motivation for this is to allow for complexity associated with the Q of S processing for a given flow to be isolated to that flow, rather than impacting the performance (including signaling performance for basic connection setup for VCs that do not need much else) of all other Vcs. Furthermore, since the Q of S messages (such as the request, the commit, the acknowledgment, etc.) are transmitted in band they can be of any arbitrary size.

Figure 9:
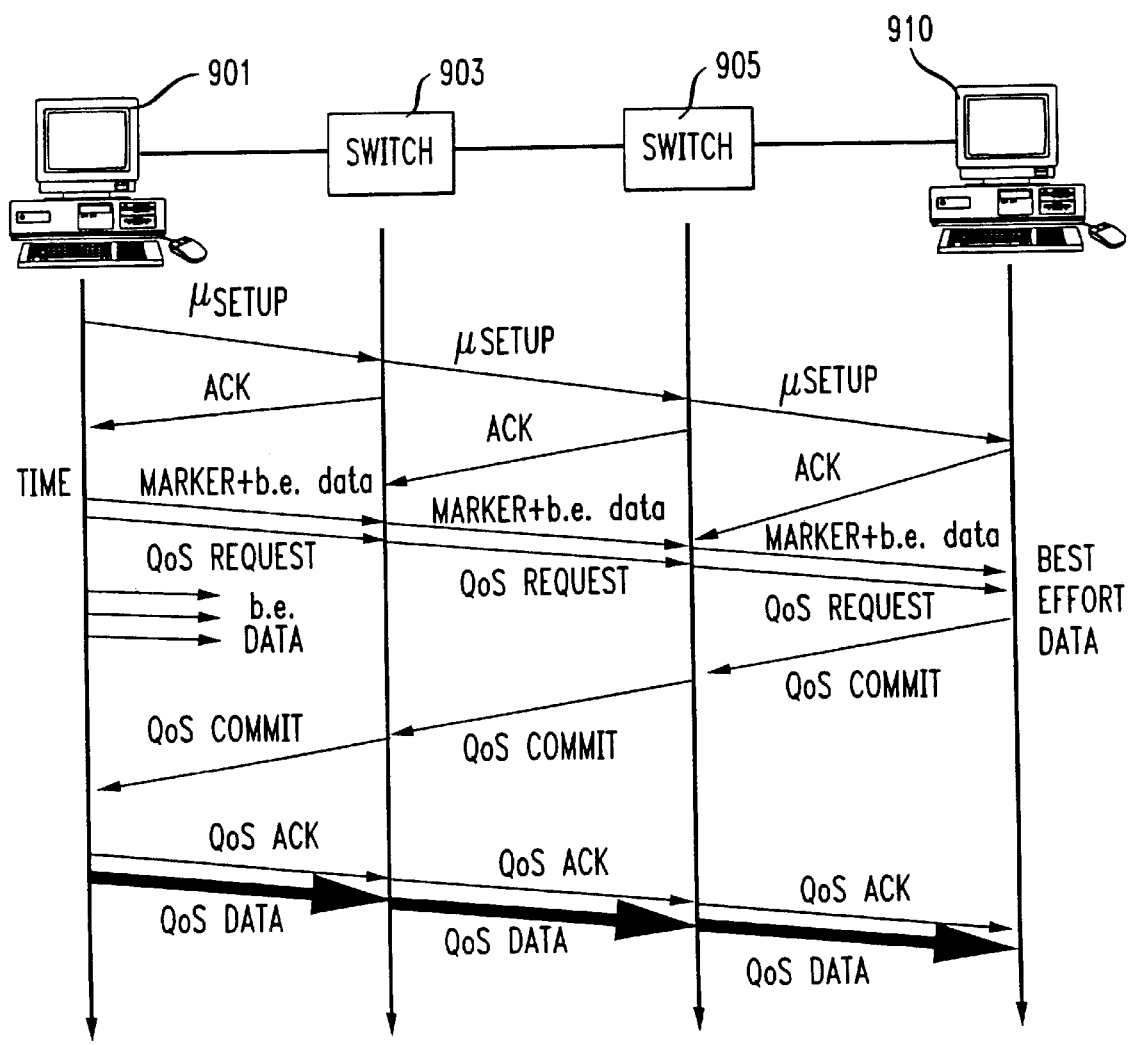
FIG. 9 illustrates a quality of service request processing operation in accordance with an embodiment of the present invention.

FIG. 9 illustrates an example of a call processing flow for dealing with a Q of S request originating from the calling party. In this example it is presumed that the application requires a Q of S guarantee sometime shortly after the first hop connection is established. Thus, the Q of S request is sent shortly following the marker. Alternatively, applications may go through an end-to-end exchange, which could include data flows on a best effort basis, before deciding what, if any, Q of S needs to be established along the VC. In such an alternative case, the Q of S request may be generated at an arbitrary time after the initial connection setup has been completed.

Once transmitted, the Q of S request is processed at the switching stations 903 and 905, to determine whether the request can be satisfied. There are several alternatives, which we cover below, for how the network may exploit parallelism in processing the Q of S negotiation across switches. After receiving and processing the Q of S request, the Q of S destination, 910, generates a Q of S commit, back to the Q of S source 901. Upon receipt of the Q of S commit, the Q of S requester can send Q of S Data (in the forward direction). The requester subsequently transmits a Q of S Ack as an announcement to the destination. Upon receipt of the Q of S Ack, the destination may also begin to transmit data that is assured the Q of S.

For compatibility with existing ATM, it is proposed that the Q of S request, Commit, and Ack, could be encoded as in the UNI connection "setup" and "connect" messages, as far as the Q of S information is concerned. However, there are three main differences. First, the present invention performs the Q of S setup, commit, and Q of S ACK in-band on the VC that is already setup. Second, the invention exploits intra-switching station multicast to get further advantages in speeding up the processing of the Q of S request and ACK. Because of the ability to do in-band signaling and the intra-switching station multi-cast, the architecture can exploit parallelism across switching stations performing the Q of S processing.

Figure 10:
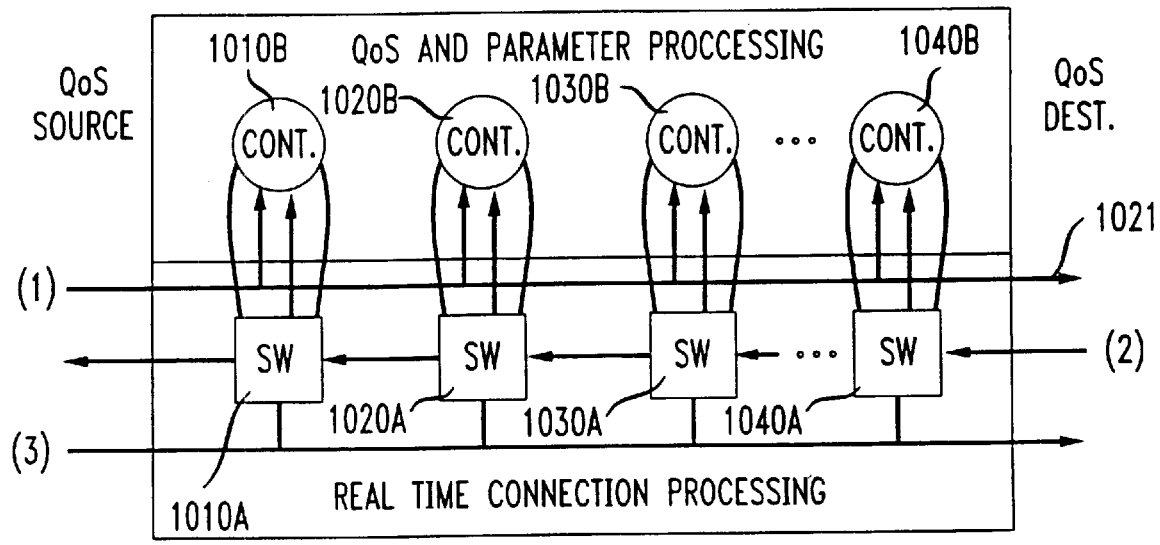
FIG. 10 illustrates an example of real time connection processing of quality of service and parameter information in accordance with one embodiment of the present invention.

In-band signaling for the Q of S also allows Q of S renegotiation during the time the connection is being used. Moreover, in-band signaling allows both Q of S setup and renegotiation from either the source or the receiver end, depending on application needs. For purposes of discussion in this section, the end-system that initiates the Q of S setup request is referred to as the "Q of S source." The end-system that responds to the Q of S setup request at the other end is the "Q of S destination". During the Q of S negotiation data may still flow on the connection on a best-effort basis. Cells that belong to the Q of S negotiation message are marked with a Payload-Type Indicator (PTI), possibly as resource management (RM) cells, so that they may flow to the controller on the switching station. Thus, in fact, signaling and data cells (or messages) may be interleaved because of the PTI value being distinct from one another for different types of cells even within the same VC. There are a number of alternatives for processing Q of S setup that take advantage of parallelism to enhance the processing. A first such alternative is described in relationship to FIG. 10. In this configuration there are a plurality of switching stations provided between the source of the Q of S request (Q of S source) and the destination of the Q of S request (Q of S dest). The illustrated stations each have separate, but coupled, switch (e.g., 1010A) and controller (e.g., 1010B) elements.

For a bidirectional Q of S flow, a three phase end-to-end protocol is needed. To exploit the potential of parallel processing of the Q of S and connection admission control (CAC), the Q of S setup request may be multicast on the VC to the output link 1021 as well as the switch controller 1010B, as it flows in the forward direction toward Q of S dest. In essence, the Q of S Request acts as an announcement of requirements to all the switching stations and the destination. Thus, in the forward direction the Q of S Request travels on the VC to the Q of S destination, while also being multicast to the switch controllers. As a consequence the controllers operate on the Request substantially in parallel. In the reverse direction, a Q of S Commit from the Q of S dest flows hop-by-hop, collecting information at each of the switching stations (for example, the amount of resources committed for the flow or finding the lowest amount of resources that can be committed to the flow at a given switching station) and is finally delivered to the Q of S source. This is shown by line (2) in the figure. This arrangement enables the communication of the result of the CAC computations to the upstream nodes as the Q of S ACK flows upstream. Note that a flow downstream from the Q of S source to the destination corresponding to the allotted Q of S can start at the end of this commit phase. Finally, the Q of S source transmits a Q of S ACK, flowing from the Q of S source down to the Q of S destination shown as line (3) in the illustration. The Q of S Ack provides the final information for commitment of resources to the switches and the destination. In particular, it confirms to the Q of S destination the Q of S committed to. Since the Q of S Commit triggers resources to be committed, the Q of S Ack is an announcement; that can also be multicast to the switch controller and the downstream link to correct over-commitment of resources at each of the switching stations.

Figure 5:
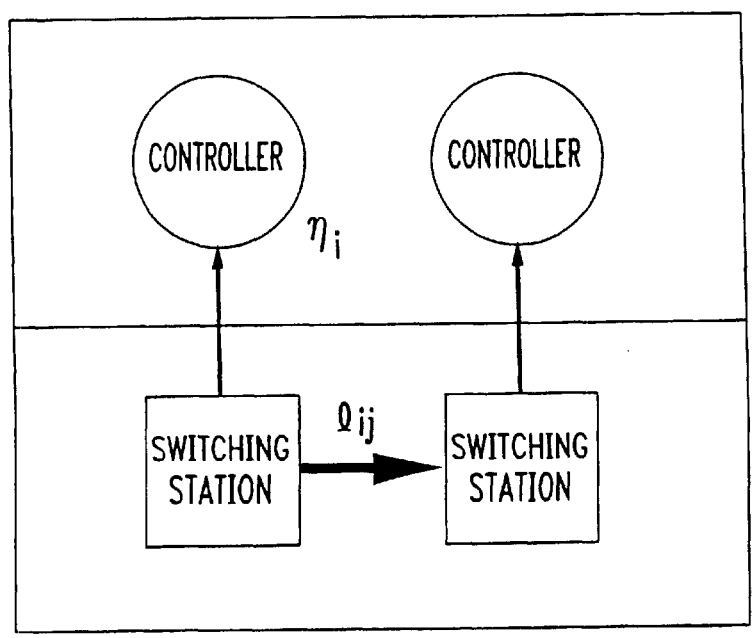
FIG. 5 is directed to explaining a connection setup in a hop-by-hop connection setup.

Thus even where a higher level connection requester may choose the conservative approach and wait for a Q of S commitment before engaging in a conversation. The parallel processing operation of the present invention provides advantages over the Q of S processing in the prior art. FIG. 5 depicts a hop in a connection setup, where $\eta_i$ is defined as the time to do Q of S processing at node i, and $l_{ij}$ denotes the latency from node i to node j. For a conventional hop-by-hop connection setup, where service provisioning is performed at each node before forwarding the connection request, the connection setup time, $\delta$, depends on both the end to end latency and the number of hops encountered. More precisely the one-way traversal time is given by $$\delta_{conventional} = 0\left(l_{0,h} + \sum_{i=0}^{h} \eta_i\right) \quad (1)$$

where h is the number of hops for the connection and $l_{0,h}$, is the latency for the whole path. In contrast, since the Q of S request is forwarded immediately, the present invention results in overlapped processing at the switch controllers. Assuming that hop-by-hop latency is small compared to the processing time, the connect message reaches the destination even before the first node has finished its Q of S processing. The result is that all nodes in the path are processing in parallel, replacing the plain sum in Equation (1) with approximately the maximum of Q of S processing times. Assuming all $\eta_i=\eta$, a blocking connection setup time (i.e., the time until commitment) in the present invention is approximately $$\delta_{lightweight\ blocking} = 0(l_{0,h}+\eta) \quad (2)$$

As the number of hops increase, and service complexity grows, this difference becomes significant. The present invention does not require blocking and so can provide a constant connection time.

$$\delta_{lightweight} = O(l). \qquad (3)$$

Thus, multicasting of the Q of S request to each switch controller improves Q of S setup performances as all the processing but that at the receiver is hidden in propagation delay. In the forward direction, a Q of S setup suffers only one processing delay, instead of the sum of serial processing at all nodes in the path plus the propagation delay. The processing on individual nodes is overlapped, and the reduction in latency is significant if nodal processing (CAC and more) is significant in comparison to the propagation delay.

Figure 11:
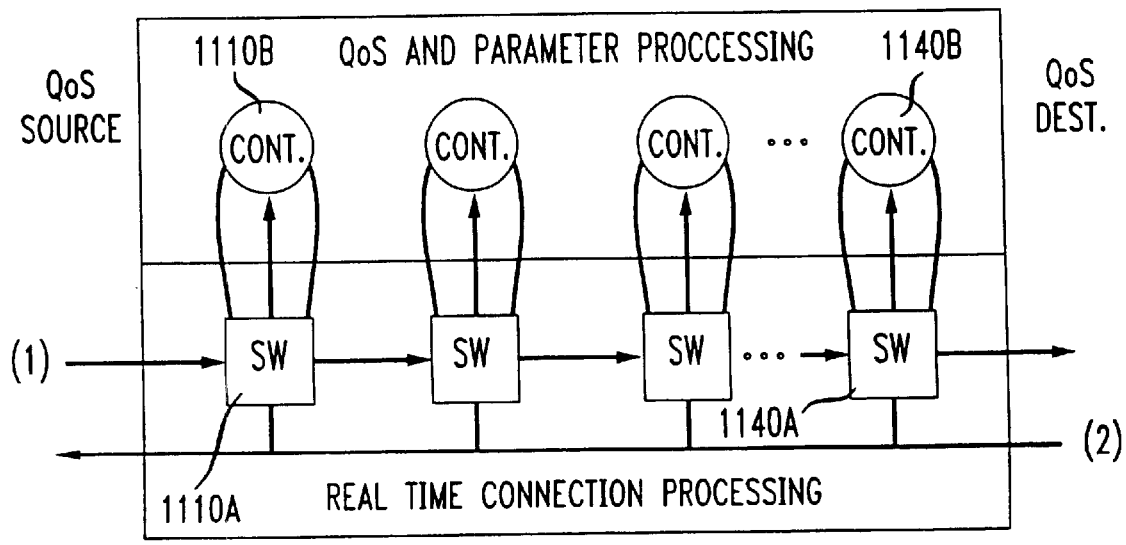
FIG. 11 illustrates an example of real time connection processing of quality of service and parameter information in accordance with another embodiment of the present invention.

A second alternative, illustrated in FIG. 11, provides Q of S negotiation that is done on a hop-by-hop basis. In this embodiment the Q of S request flows from the Q of S source to the controller 1110B associated with the first switch, 1110A. All of the CAC functions are performed at that switching station by the controller 1110B, before forwarding the Q of S setup to the downstream node. Data arriving on the VC during this time continues to be forwarded on a best-effort basis. The Q of S commit returning from the Q of S destination arrives at the first switch in the first switching station in the reverse direction, shown as 1140A in the drawing figure where it is multicast to the controller of that station 1140B, as well as to the output link, line (2). Since the primary function of the returning Q of S commit is to notify the switches and the Q of S source of the result of the negotiation (less than or equal to committed resources at any switch) there are no sequence constraints on message delivery. Therefore, using the intra-switching station multicast mechanism potentially exploits parallel processing among switching stations in the reverse path. The Q of S commit acts as an announcement to all the switching stations as it flows back to the Q of S source. This option is applicable when the Q of S request is for one direction alone, from the Q of S source to the Q of S destination, as there is no need for an acknowledgment phase of the Q of S negotiation described in FIG. 10, since the destination is not waiting for a notification of when the Q of S commitment has been made.

A third option for Q of S setup allows the Q of S management function that is typically provided in current IP networks with RSVP-like signaling. The primary difference between this option and the previous two options is the observation that there is no need to communicate the availability of resources from one switch to the next, for RSVP style Q of S management. The Q of S source (in fact with RSVP, this is the destination of the connection) makes an announcement to all the nodes in the network of its requirements. The nodes (switches) in the network either are able to provide the resources, in which case, they silently acquiesce, or send a "reject" out of band. The rejection of the request is done by each individual switch directly to the Q of S source through an ICMP reject message. One or more of these "reject" messages will be received by the Q of S source, depending on how many of the switches are unable to provide the resources. The Q of S source may maintain a timer to await ICMP rejects from all the switches. When the timer expires, the source may once again send an "announcement" (the Q of S Ack in the third pass of option 1) to all the switches to commit resources, or release the resources.

The use of in-band Q of S setup also provides further flexibility in defining Q of S for a connection. For instance, it permits the destination to generate a Q of S request in the reverse direction if so desired. In fact, this may be a desirable model for flexible Q of S management: the basic connectivity, and the availability of information is announced by the source and a path for communication is established from the source to the destination; subsequently, when the receiver (user) is willing to pay for a particular grade of service, the Q of S setup is issued from the receiver back to the sender of the information. The present invention supports Q of S setup from either sender or receiver. Furthermore, the in-band treatment means that Q of S requests can be generated, transmitted and processed at any time during the connection. This means that after a Q of S is first established it can be renegotiated by either party to the connection at any time during the connection.

Multicast Q of S

In the architecture of the present invention a Q of S request may be initiated by any participant of a multicast, the core (if present), source or a leaf. Moreover, unless otherwise dictated by higher level policies, core/source and leaf initiated Q of S may all be used at different times for the same multicast. A core/source based Q of S setup may be more efficient in some cases, especially in a completely homogeneous network, or a network with links having adequate capacity. However, there are a wide range of practical circumstances where a leaf initiated Q of S is appropriate. In fact, there may be situations where a core/source based join for connectivity may be appropriate, and a leaf based Q of S setup is desirable. Unlike in a unicast call, for multicast the Q of S request has to necessarily flow through the controller with respect to switching station at branching points. It is possible to take advantage of the intra-switch multicast mechanism as described above over various branches between branching points.

Leaf Initiated Q of S

Figure 12A:
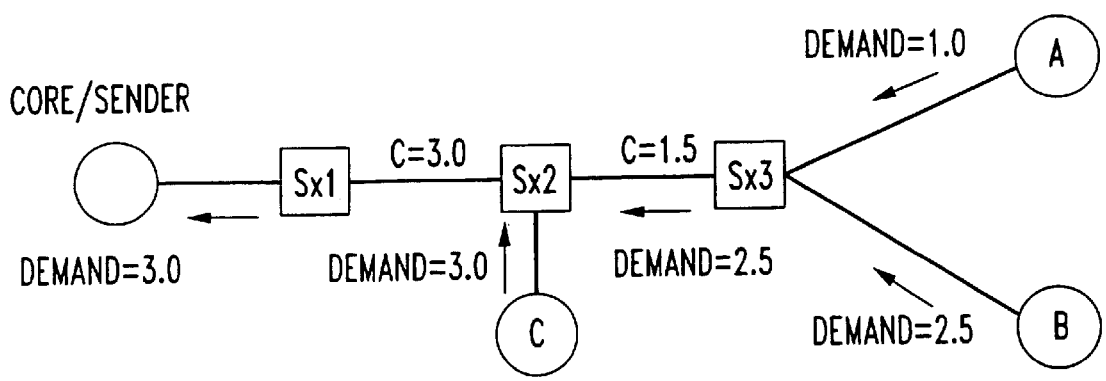
FIG. 12 illustrates an example of Q of S processing results for a multicast operation in accordance with an embodiment of the present invention.
Figure 12B:
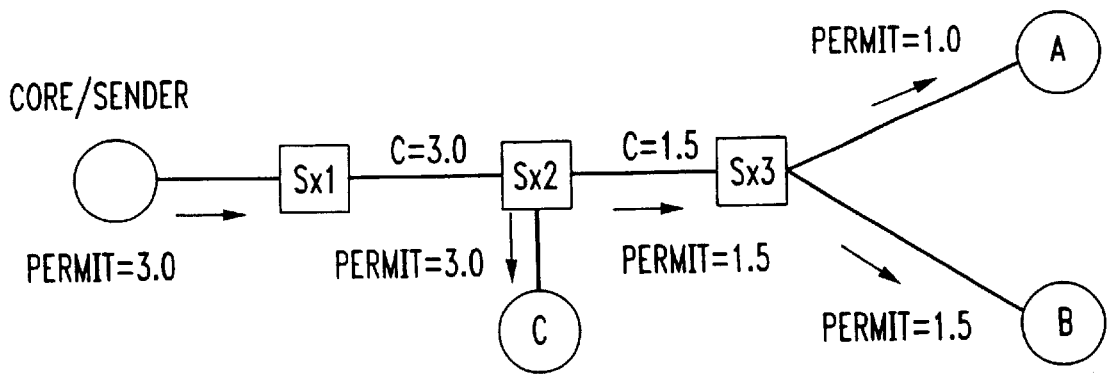

Leaf Initiated Q of S allows participants to selectively request Q of S, while continuing to provide best-effort service to others. The policy is first described in the context of a single sender/core based approach, with the leaves requesting the Q of S upstream. This is shown in FIG. 12. The leaf initiated Q of S requests carry the "demand" from the receivers such as A or B, upstream. When the Q of S request arrives at a switch, e.g., Sx3 the "demand" is noted at the switch. The switch conveys upstream, the maximum of all the demands observed from the different branches (a leaf node or a switch may be at the end of the branch). Thus:

demand communicated upstream=max(demand$_i$)

for all requests "i" seen from the branch points.

In FIG. 12 the leaf A provides a demand of 1.0 Mbits/sec to switch Sx3 and leaf B provides a demand of 2.5 Mbits/sec to the same switch. Switch Sx3 then forwards the maximum demand, 2.5 Mbits/sec, upstream to switch Sx2. Then that switch forwards the maximum demand it has received, here 3.0 Mbits/sec which is the demand from C, to switch Sx1. Finally, this last switch sends the demand to the core/sender.

Note that different leaves may issue their Q of S requests at different times. The switch examines each Q of S request and transmits a request upstream only if the Q of S request is higher than the current maximum. When the "demands" arrive at the core/sender, the permission returned is the minimum of the offered capacity, the demands received from the leaves and the available link capacity. The permit returned by a switch to the downstream node is:

permit=min (offered capacity, available link capacity, demand$_i$).

The offered capacity can be either the particular sender's or core-specified requirement for the flow. The available link capacity is that available to the flow on the link from this switch to the next hop along the branch that this permit is returned on.

In FIG. 12 the link capacity between S×1 and S×2 is 3.0 Mbits/sec while the link capacity between S×2 and S×3 is 1.5 Mbits/sec. When the permit is returned, under this scenario, the offered capacity at S×2 is determined to be 1.5 Mbits/sec, which is the link capacity from S×2 to S×3 and so the permit to S×3 is set at 1.5 Mbits/sec. The permit returned to A is determined by the "demand" from A which is less than the link capacity. The permit returned to B is controlled by the link capacity 1.5 Mbits/sec.

Note that each switch needs to maintain state, which is the "demand" and the "permit" returned for each branch for the multicast call. The leaf may be a source or a receiver, requesting a Q of S on a shared distribution tree (e.g., core based tree).

Core Initiated Q of S

In a core initiated Q of S the core issues a Q of S setup request that flows in-band down to all the leaves in the network. The request is replicated at branch points, in the natural way that messages of a multicast call are replicated. The Q of S request carries a "demand" for the call. The commits for the Q of S returned from the leaves carry the "permit". When an ACK arrives at a switch, on its way upstream, the Q of S value (e.g., bandwidth) returned (the permit) is noted for that flow-id. Subsequent ACKs returned from either the same branch or different branches are compared with the current permit noted with the flow-id. The minimum of the permits noted at the switch and the value in the ACK is retained as the permit at that switch. If the value returned in the ACK is smaller, then this ACK is forwarded up towards the core. If the value returned in the ACK is larger than the current permit noted at the switch, the ACK is suppressed. In this way, the core knows the minimum of the rate possible to all the receivers, while reducing the number of ACKs that are returned to the core whenever possible. It must be noted however, that in the worst case, a distinct ACK flows back from each one of the leaves, if the new value returned is lower than the previous. This model is particularly reasonable when we look at a multicast tree where all of the participants get the same Q of S, which is the minimum capability among all the participants, and the available capacity on the links traversed.

Interfacing to UNI Networks

It is important to consider the interoperation of the environment of the architecture of the present invention and existing UNI ATM environments. Possible scenarios include: a calling or source station residing in a network according to an embodiment of the present invention with the destination or called station in an existing UNI ATM network; or the calling or source station residing in the UNI ATM network with the destination or called station residing in a network according to an embodiment of the present invention.

Figure 13:
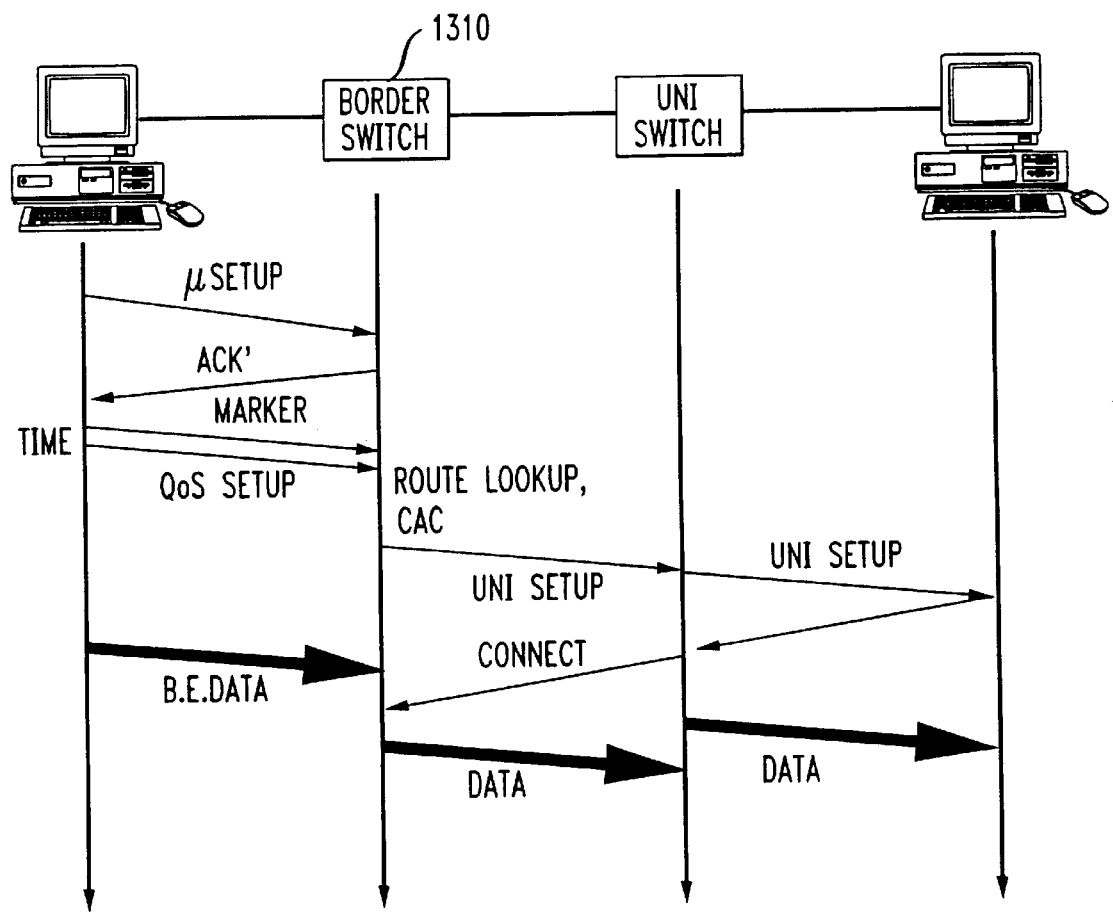
FIG. 13 illustrates an example of coupling a network according to an embodiment of the present invention with an existing ATM network.

FIG. 13 illustrates an example of a coupling of a UNI network and a network in accordance with the present invention with the source or calling station residing in the latter network. A border switch 1310 couples the two networks. When the border switch receives the micro-setup, upon completing a lookup, it determines this call has to be forwarded to a UNI environment.

A full UNI setup message (that is mostly pre-computed) has to be created by the border switch. The primary issue is that of handling Q of S requests that arrive on the network of the present invention subsequently. There are three different alternatives:

1. Treat the connection as a best-effort connection, since there is no additional information at the time the micro-setup is seen. The connection setup on the UNI side is a UBR connection. This alternative is reasonable when renegotiation is possible on the UNI cloud, subsequently when the actual Q of S request arrives from the other environment.

2. Wait for the Q of S request from the network of the present invention and only then issue a UNI setup request. This requires the border switch to act like a virtual destination, in that it issues an ACK for the micro-setup and buffers the best effort data arriving from the source network environment until the Q of S request arrives. This alternative may be reasonable when the micro-setup actually indicates that this connection is likely to be a Q of S flow (through the Quality of Service class indication in the micro-setup). It is also therefore likely that there will only be a small amount of data transmitted prior to the source issuing a Q of S request. Buffering at the border switch would therefore be until the round-trip completes on the UNI cloud, strictly on a per-VC basis. Note that the buffering requirement is potentially small if the best-effort flow is flow-controlled, such as the TCP. The TCP connection setup will be the only request issued, and data will flow only after the full end-end connection is established, and the TCP handshake is completed. Of course, this somewhat reduces the effectiveness of the network of the present invention, unless the UNI cloud is a relatively small one.

3. The third alternative is to setup the UNI connection as a UBR (best-effort) connection, when the micro-setup arrives. Subsequently, when the Q of S request arrives, the connection is re-established on an appropriate path with the Q of S negotiation. This involves more overhead, but allows for best effort data to flow until the Q of S request arrives. But the transition from one path to the other needs to be carefully handled at the border, so that there is no corruption of data due to improper cell sequencing.

It is believed that the first alternative may be most attractive, and depends on reasonable renegotiation capabilities in the UNI cloud. Note that in all cases, the Q of S commitment is returned by the destination, and not the border switch.

The other interoperability environment that needs to be considered is that of a source residing on a UNI environment, and the destination is on a network of the present invention. A regular UNI 4.0 connection setup request is received from the source. This arrives at a border switch. The border switch may or may not send a UNI CONNECT message back to the UNI switch, depending on the policy implemented, and the Q of S request seen on the UNI connection setup request.

1. If the border switch does not concern itself with the Q of S characteristics requests, the CONNECT is returned immediately back to the UNI source. The source can then start transmitting data, and the border switch forwards the data on a best effort basis. The border switch transmits the micro-setup towards the destination in the network of the present invention, thus taking advantage of the buffering in that network path. The border switch may then transmit the Q of S request, to negotiate the appropriate service quality on that path. This method of operation at the border appears reasonable when the original UNI connect request was for a UBR flow, that is equivalent of the best-effort service on the latter network.

2. The other option, where the border switch pays attention to the Q of S requested from the UNI source is to not return the CONNECT back to the source until a commitment for Q of S is received back from the destination. The border switch breaks up the original UNI SETUP into a micro-setup and a Q of S request. Although this appears to be taking a single UNI setup message and creating two, there is still some benefit in doing this. The benefit is that the Q of S processing in the network of the present invention may go on substantially in parallel with the routing of the micro-setup.

Once again, in all of the above cases, the Q of S commitment comes from the destination of the call.

Concatenation of multiple environments involves just the composition of the two types of interoperability mechanisms described above. The only concern is when a network according to the present invention interconnects two UNI clouds. In such a configuration, the first border switch breaks up the UNI SETUP into a micro-setup and a Q of S request. Then, the second border switch, from the network of the present invention to the UNI cloud sets up a UBR connection on the UNI cloud, with a subsequent re-negotiation to the appropriate Q of S class. However, if the second border switch were to receive the micro-setup and then wait for the Q of S request also to arrive from the network of the present invention cloud, then the need for re-negotiation on the UNI cloud may be unnecessary. We can include a bit in the micro-setup to indicate that the Q of S request follows immediately (because the original UNI was itself broken into the two messages, with no likelihood of data arriving until the round trip is complete). This way, the second border switch can wait and construct a complete UNI SETUP, to avoid renegotiating or re-routing the call on the UNI cloud.

End host capability (primarily software) to support UNI ro UNITE may be mapped into one of these cases.

Conclusion

The present invention provides a new lightweight signaling architecture for packet data. The architecture is designed to use a relatively non-complex setup message which can incorporate a coarse quality of service description to establish a best efforts connection between two stations. The connection can be established on a hop-by-hop basis thereby allowing data to flow before the complete connection is established.

The present invention also provides that the Q of S processing can be performed with "in band" signaling, that is with use of the established VC. This enhances the extensibility of the network. With the present invention providing a greater separation between switching functions and controller functions in the switching stations, as well as an intra-switching station multi-cast capability, the processing time for Q of S requirements can be significantly reduced while allowing a continued flow of, at a minimum, best efforts data transmissions.

While the present invention has been described with respect to particular structures, for example the structure of a micro-setup cell, it should be recognized that these are meant as examples and are not meant to be exclusive structures for effecting the present invention.

What is claimed is:

1. A method for expediting call connectivity between a first point and a second point via an intermediate station, the method comprising the steps of:

receiving a first connection request at the intermediate station, the first connection request having between transmitted downstream from the first point;

transmitting, from the intermediate station toward the second point, a second connection request; and transmitting from the intermediate station upstream toward the first point in response to said first connection request, wherein said connection acknowledgment is transmitted prior to receiving an acknowledgment of connectivity between the intermediate station and the second point.

2. The method of claim 1 wherein said step of transmitting a connection acknowledgment from the intermediate station occurs prior to the step of transmitting the second connection request.

3. A method for establishing call connectivity between a first point and a second point via an intermediate station comprising the steps of:

receiving, at the intermediate station, a first call connectivity request from the first point;

transmitting, from the intermediate station toward the first point, a connection acknowledgment related to said first call connectivity request thereby establishing connectivity between said first point and said intermediate station;

transmitting a second call connectivity request from the intermediate station toward the second point; and receiving, at the intermediate station, a call connection acknowledgment related to said second call connectivity request thereby establishing connectivity between said intermediate station and said second point, wherein said connectivity between said first point and said intermediate station is established before establishing said connectivity between said intermediate station and said second point.

4. The method of claim 3 wherein said step of transmitting a connection acknowledgment related to said first call connectivity request occurs prior to said step of transmitting said second call connectivity request.

5. In a process for setting up a call from a first point to a second point via an intermediate station, a method for establishing connectivity from the first point to the second point, the method comprising the steps of:

establishing connectivity from the first point to the intermediate station; and establishing connectivity from the intermediate station to the second point, wherein a connection between said intermediate station and the second point occurs after the connectivity from the first point to the intermediate station is established.

6. A method for setting up a call between a first point and a second point via an intermediate station, the method comprising the steps of:

establishing connectivity from the first point to the intermediate station;

establishing connectivity from the intermediate station to the second point; and receiving data at the intermediate station, via the connectivity established from the first point to the intermediate station, prior to establishing connectivity from the intermediate station to the second point.

7. The method of claim 6 comprising the further steps of:

storing the received data at the intermediate station; and forwarding the stored data after connectivity between the intermediate station and the second point is established.

8. In a packet data network a method for setting up a call between a first station and a second station via a plurality of hops, the method comprising the steps of:

receiving a connectivity request at a first node over a first hop;

transmitting a connection acknowledgment from said first node over said first hop;

transmitting a second connectivity request from the first node over a second hop to a second node;

transmitting a third connectivity request from said second node over a third hop;

transmitting a second connectivity acknowledgment from said second node to said first node over said second hop; and wherein data can be sent over said first hop before said second connectivity acknowledgment is received at said first node.

9. The method of claim 8 comprising the first steps of:

receiving data at said first node over said first hop; and transmitting the received data to said second node over said second hop prior to said second node receiving a connectivity acknowledgment via said third hop.

10. In a packet data network, a method for setting up a call between a first station and a second station via at least one node, the method comprising the steps of:

receiving a first connection request relating to the first station and including code to be associated with the call;

transmitting a second connection request for the node toward the second station, said second connection request including said code associated with the call; and transmitting a first acknowledgment, related to said first connection request, toward the first station;

wherein a connection between said node and said first station is established before a connection is established between said node and said second station.

11. The method of claim 10 wherein said first connection request comprises a micro set-up call.

12. The method of claim 10 wherein said micro set-up cell identifies a classification type for the call to be set up.

13. The method of claim 12 wherein said classification type relates to a desired quality of service for the call.

14. The method of claim 2 wherein said step of establishing call connectivity comprises the substeps of:

receiving a first call connection request at a first node;

transmitting toward a first of said points an acknowledgment of said first call connection request.

15. The method of claim 3 wherein said step of transmitting said acknowledgment occurs before establishing a connection between said first node and a second of said points.

16. The method of claim 3 wherein said step of using the established connection to set service parameters comprises the substeps of:

receiving at the node, via one of the connections, a request for a selected quality of service;

processing the quality of service request to determine whether the request can be satisfied; and setting at least one transmission parameter for the call based on the results of said step of processing.

17. The method of claim 5 wherein said request for a quality of service is generated by a calling party.

18. The method of claim 6 wherein said request for a quality of service is generated by a calling party.

19. The method of claim 8 wherein said quality of service request is received from the called station.

20. The method of claim 8 wherein said step of setting a level comprises the substep of negotiating a level of service with a station issuing the quality of service request.

21. The method of claim 11 wherein said quality of service request is received from the called station.

22. The method of claim 11 wherein said step of setting a level comprises the substep of negotiating a level of service with a station issuing the quality of service request.

23. The method of claim 16 comprising the first steps of processing said received service request acknowledgment; and adjusting operational parameters at said first one of the switching stations in response to said processing of said received service request acknowledgment.

24. The method of claim 17 comprising the further step of forwarding the received service request acknowledgment in a direction toward the source of the received service request.

25. The method of claim 18 wherein said step of forwarding occurs prior to completion of said step of processing said received service request acknowledgment.

26. The method of claim 16 wherein the received service request is issued by a calling party.

27. The method of claim 16 wherein the received service request is issued by the called party.

28. The method of claim 16 wherein said second service request transmitted by said first one of the switching stations is interspersed with data along the connection.

29. The method of claim 21 comprising the first step of:

transmitting a connection request acknowledgment from said first switching station toward the source of the connection request, said step of transmitting occurring before any receipt at said first switching station of a connection acknowledgment initiated by either of the first or second receivers.

30. The method of claim 22 wherein, after a connection is established to one of the two receivers, receiving at the first switching station a service request originated by the first connected receiver.

31. The method of claim 23 wherein, after a connection is established to one of the two receivers, receiving at the first switching station a service request originated by the first connected receiver.

32. The method of claim 24 wherein, after connection is established to a second one of the two receivers, receiving at the first switching station a service request originated by the second connected receiver.

33. The method of claim 28 comprising the first step of establishing first service parameters for said branch connection and second service parameters for a portion of said first connection between said branching switching station and said second station.

* * * * *

UNITED STATES PATENT AND TRADEMARK OFFICE
CERTIFICATE OF CORRECTION

PATENT NO.    : 6,556,577 B2
DATED         : April 29, 2003
INVENTOR(S)   : Gisli Hjalmtysson and Kadangode K. Ramakrishnan It is certified that error appears in the above-identified patent and that said Letters Patent is hereby corrected as shown below:

<u>Column 25,</u>
Line 39, the reference to "claim 10" is revised to -- claim 11 --.

Signed and Sealed this

Ninth Day of September, 2003

JAMES E. ROGAN
*Director of the United States Patent and Trademark Office*